United States Patent
Abdallah et al.

(10) Patent No.: US 11,667,043 B2
(45) Date of Patent: Jun. 6, 2023

(54) COUNTERBALANCE MECHANISM FOR ROBOTIC ASSIST DEVICE

(71) Applicant: GM GLOBAL TECHNOLOGY OPERATIONS LLC, Detroit, MI (US)

(72) Inventors: Muhammad E. Abdallah, Rochester Hills, MI (US); James W. Wells, Rochester Hills, MI (US); Peter Kresmery, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 249 days.

(21) Appl. No.: 17/171,549

(22) Filed: Feb. 9, 2021

(65) Prior Publication Data
US 2022/0250262 A1  Aug. 11, 2022

(51) Int. Cl.
| | |
|---|---|
| B25J 19/00 | (2006.01) |
| B25J 9/10 | (2006.01) |
| B25J 9/14 | (2006.01) |
| B25J 9/16 | (2006.01) |
| B25J 9/00 | (2006.01) |
| B25J 13/08 | (2006.01) |

(52) U.S. Cl.
CPC ......... *B25J 19/0016* (2013.01); *B25J 9/0009* (2013.01); *B25J 9/109* (2013.01); *B25J 9/1065* (2013.01); *B25J 9/144* (2013.01); *B25J 9/1633* (2013.01); *B25J 9/1638* (2013.01); *B25J 13/088* (2013.01)

(58) Field of Classification Search
CPC ...... B25J 9/1065; B25J 9/144; B25J 19/0008; B25J 19/0016
USPC .................... 414/719, 917; 901/48
See application file for complete search history.

(56) References Cited

U.S. PATENT DOCUMENTS

| | | | | |
|---|---|---|---|---|
| 3,259,351 A | * | 7/1966 | Olsen | B66C 13/18 414/730 |
| 3,721,416 A | * | 3/1973 | Goudreau | B66C 23/005 414/730 |
| 3,880,393 A | * | 4/1975 | Watson | B66C 23/005 248/325 |

(Continued)

FOREIGN PATENT DOCUMENTS

| | | |
|---|---|---|
| DE | 102010052418 A1 | 6/2011 |
| DE | 102016220410 A1 | 4/2017 |

(Continued)

*Primary Examiner* — William C Joyce
(74) *Attorney, Agent, or Firm* — Quinn IP Law

(57) ABSTRACT

An electromechanical system operates in part through physical interaction with an operator, and includes a multi-axis robot, a controller, and a counterbalance mechanism connected to the robot. The counterbalance mechanism includes a base structure connected to a set of linkages, a pneumatic cylinder, a spring-loaded cam assembly, and an optional constant force spring. The linkages form a four-bar parallelogram assembly connectable to a load. The cylinder and cam assembly, and optional constant force spring, each impart respective vertical forces to the parallelogram assembly. The forces combine to provide gravity compensation and self-centering functions or behaviors to the load, enabling the load to move with a vertical degree of freedom when manually acted upon by the operator, and to return the load to a nominal center position.

20 Claims, 5 Drawing Sheets

(56) References Cited

U.S. PATENT DOCUMENTS

| | | | | |
|---|---|---|---|---|
| 4,226,567 | A | * | 10/1980 | Van Orsdale, Jr. .. B65H 67/065 414/733 |
| 4,907,571 | A | * | 3/1990 | Futakami ............... A61H 3/008 482/901 |
| 5,397,323 | A | * | 3/1995 | Taylor .................... A61B 34/71 901/41 |
| 5,456,130 | A | * | 10/1995 | Pierson ................ B66C 23/005 16/400 |
| 5,755,043 | A | * | 5/1998 | Belanger ................ B60S 3/002 15/312.1 |
| 8,985,354 | B2 | | 3/2015 | Lecours et al. |
| 9,359,176 | B2 | | 6/2016 | Gao et al. |
| 9,630,815 | B2 | | 4/2017 | Gao et al. |
| 9,850,108 | B2 | | 12/2017 | Gao et al. |
| 10,583,557 | B2 | | 3/2020 | Abdallah et al. |
| 10,626,963 | B2 | | 4/2020 | Abdallah et al. |
| 10,759,634 | B2 | | 9/2020 | Abdallah et al. |
| 2020/0156245 | A1 | | 5/2020 | Abdallah et al. |
| 2021/0017002 | A1 | | 1/2021 | Abdallah et al. |

FOREIGN PATENT DOCUMENTS

| | | |
|---|---|---|
| DE | 102012220035 A1 | 10/2017 |
| DE | 102012220036 B4 | 10/2017 |
| DE | 102013203719 A1 | 11/2017 |
| DE | 102018102995 A1 | 8/2018 |

* cited by examiner

COUNTERBALANCE MECHANISM FOR ROBOTIC ASSIST DEVICE

INTRODUCTION

Manufacturing work tasks often require manipulation and positioning of a payload. For example, an operator may be called upon to operate a bulky handheld power tool, or to physically maneuver a relatively cumbersome component within the confines of an automated work cell. Material handling, product assembly, and other manufacturing tasks likewise present task loads that, at times, are largely borne by the operator. Work environments using such direct operator-load interaction can experience reduced ergonomic freedom of movement and/or suboptimal load compliance.

SUMMARY

An electromechanical system is disclosed herein that is operable through the above-noted interaction by an operator with a payload, e.g., a work tool, component, workpiece, or other mass. Within the scope of the present disclosure, in such operator-load interactions a point of interaction exists between the operator and the electromechanical system and/or the payload supported thereby. For instance, the operator may push a payload in a particular direction within the work cell while the payload is suspended by a multi-axis robotic system.

Manual interaction between the operator and the payload is distinguished herein from teleoperated systems in which an end-effector of a robot is connected to the payload, with movement of the end-effector thereafter remotely commanded via transmission of electronic control signals to the robot's joint actuators. In other words, the present solution requires that a kinematic path/force path exists between the operator and the payload, with operator-generated forces (manual forces) acting on the payload either directly or through intervening linkages of the electromechanical system. The electromechanical system, when used in the above-noted human-machine interaction, enables vertical displacement of the payload using low-impedance gravity compensation and self-centering behaviors. Together, the disclosed features allow the electromechanical mechanism to be used with a variable payload.

More specifically, the present solution relies on multiple vertical force elements to achieve the above-noted gravity compensation and self-centering functions, including at least a pneumatic cylinder and a spring-loaded cam assembly. Optionally, the vertical force elements may also include one or more constant force springs, which would work in conjunction with the pneumatic cylinder for achieving gravity compensation of the payload. The spring-loaded cam assembly separately performs the self-centering function. As will be appreciated by those skilled in the art, a high-magnitude load is typically supportable by a high spring stiffness. By offloading the self-centering behavior to the spring-loaded cam assembly as described herein, the present solution enables the gravity compensation behavior to be performed with lower levels of friction and stiffness.

According to a non-limiting exemplary embodiment, an electromechanical system, operable through physical interaction with an operator, includes a multi-axis robotic system, e.g., a multi-axis serial robot or an overhead rectilinear system. The electromechanical system also includes a controller having memory and a processor, and a counterbalance mechanism that is connected to the robotic system. The counterbalance mechanism in this embodiment includes a base structure and a set of linkages, with the linkages being rotatably interconnected to form at least one four-bar parallelogram assembly. Each four-bar parallelogram assembly is connected to the base structure and configured to connect to a payload.

Within the electromechanical structure of the counterbalance mechanism, a pneumatic cylinder with an electronically-variable regulator is connected to the four-bar parallelogram assembly, and configured to impart a first vertical force thereto, i.e., by acting on a constituent link as described herein. The electronically-variable regulator in such a configuration is operable for adjusting the first vertical force, e.g., automatically in response to a pressure control signal from the processor indicative of a change in the payload, so as to compensate for the weight of different payloads. The different payloads contemplated herein may include multiple payloads, or a single payload that is picked up and dropped off.

A spring-loaded cam assembly is likewise connected to the four-bar parallelogram assembly, and is configured to impart a second vertical force to thereto. In such an arrangement, the first and second vertical forces combine to provide the above-noted gravity compensation and self-centering functions for the payload when the payload is coupled to the four-bar parallelogram assembly. This multi-force cooperation ensures that the payload moves with a vertical degree of freedom (DOF) when the payload is manually acted upon or interacted with by the operator, and returns to a nominal center equilibrium position when the load is no longer manually acted upon by the operator, i.e., when the payload is released or removed.

One or more joint sensors may be placed in communication with the controller in some configurations. Each joint sensor is configured to measure a particular joint angle of the four-bar parallelogram assembly, and to transmit a corresponding joint angle signal to the controller, with the joint angle signal being indicative of the measured joint angle. The controller in some embodiments is configured to adjust or maintain a position of the multi-axis robotic system in response to the joint angle signal.

The multi-axis robotic system may include an articulated serial robot or an overhead rectilinear gantry system in different exemplary configurations.

A possible embodiment of the base structure includes a distal face plate and a parallel pair of vertical support beams fixedly connected thereto.

The set of linkages may include first and second sets of linkages, with the four-bar parallelogram assembly possibly including a pair of four-bar parallelogram assemblies constructed from the respective first and second sets of linkages, and arranged in parallel planes. Such a parallel configuration may enhance structural integrity of the counterbalance mechanism.

The base plate may be rigidly connected to the multi-axis robotic system. Alternatively, a distal horizontal compliance mechanism may be rotatably connected to a mounting plate, with the distal horizontal compliance mechanism having a plurality of vertical linkages enabling the payload to move with one or more horizontal DOF.

In different exemplary embodiments, one or more constant force springs may be connected to the base structure and the four-bar assembly. The constant force spring(s) may include mechanical springs, such as rolled sheet metal springs, or a set of magnetic springs in different configurations.

The above-noted and other possible features and advantages of the present disclosure will be readily apparent from the following detailed description of the embodiment(s) and best mode(s) for carrying out the disclosure when taken in connection with the accompanying drawings and appended claims.

Figure 1:
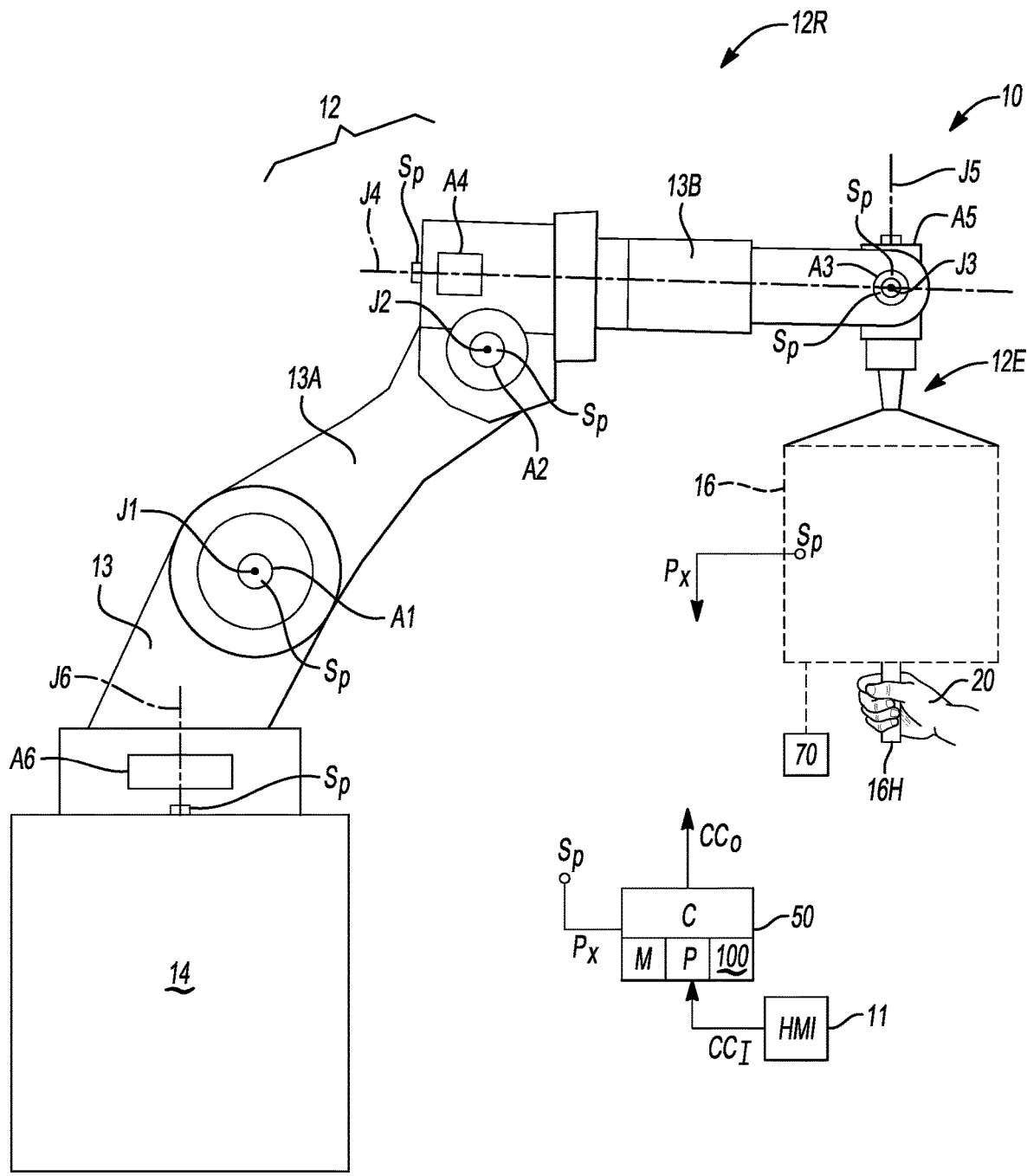
FIGS. 1 and 2 are schematic illustrations of an electromechanical system having a counterbalance mechanism constructed in accordance with the present disclosure, with FIG. 1 depicting representative use with an overhead multi-axis serial robot and FIG. 2 depicting an alternative use with a rectilinear gantry system.

Representative embodiments are shown in the drawings and described in detail herein, with the drawings presented in a simplified schematic form and not to scale. For purposes of convenience and clarity, directional terms such as top, bottom, left, right, up, over, above, below, beneath, rear, and front, may be used with respect to the drawings. These and similar to directional terms are not to be construed to limit the scope of the disclosure.

DETAILED DESCRIPTION

Referring to the drawings, wherein the same or similar reference numerals refer to the same or like structure throughout the various Figures, an electromechanical system 10 is shown schematically in FIG. 1. The electromechanical mechanism 10, which is operable through physical interaction with an operator 20 as set forth herein, includes a multi-axis robotic system 12 (FIG. 1) or 120 (FIG. 2) having a controller (C) 50 and a counterbalance mechanism 16 constructed as set forth herein. The counterbalance mechanism 16, representative embodiments of which are described below with reference to FIGS. 3-5, may be connected to/suspended from the multi-axis robotic system 12 or 120, with two possible constructions shown in FIGS. 1 and 2 for a multi-axis robot 12R and an overhead rectilinear gantry system 12G, respectively.

As set forth in detail below, the counterbalance mechanism 16 when used as part of the electromechanical system 10 of FIGS. 1 and 2 facilitates physical interaction with the operator 20 when the operator 20 interacts with a payload 70, e.g., tool, component, assembly, object, or other mass. The multi-force construction of the counterbalance mechanism 16 enables a gravity compensation function to occur relative to the mass of the payload 70, with low perceived stiffness to the operator 20. Such interaction may occur when the operator 20 pushes or pulls on the payload 70, for instance, whether using a handle 16H of FIG. 1 or by acting directly on the payload 70 and/or the counterbalance mechanism 16 connected thereto. As noted above, the operator 20 remains in a kinematic chain extending between the operator 20 and the payload 70, such that manual forces imparted by the operator 20 passes through the payload 70 and/or the counterbalance mechanism 16 coupled thereto.

Figure 2:
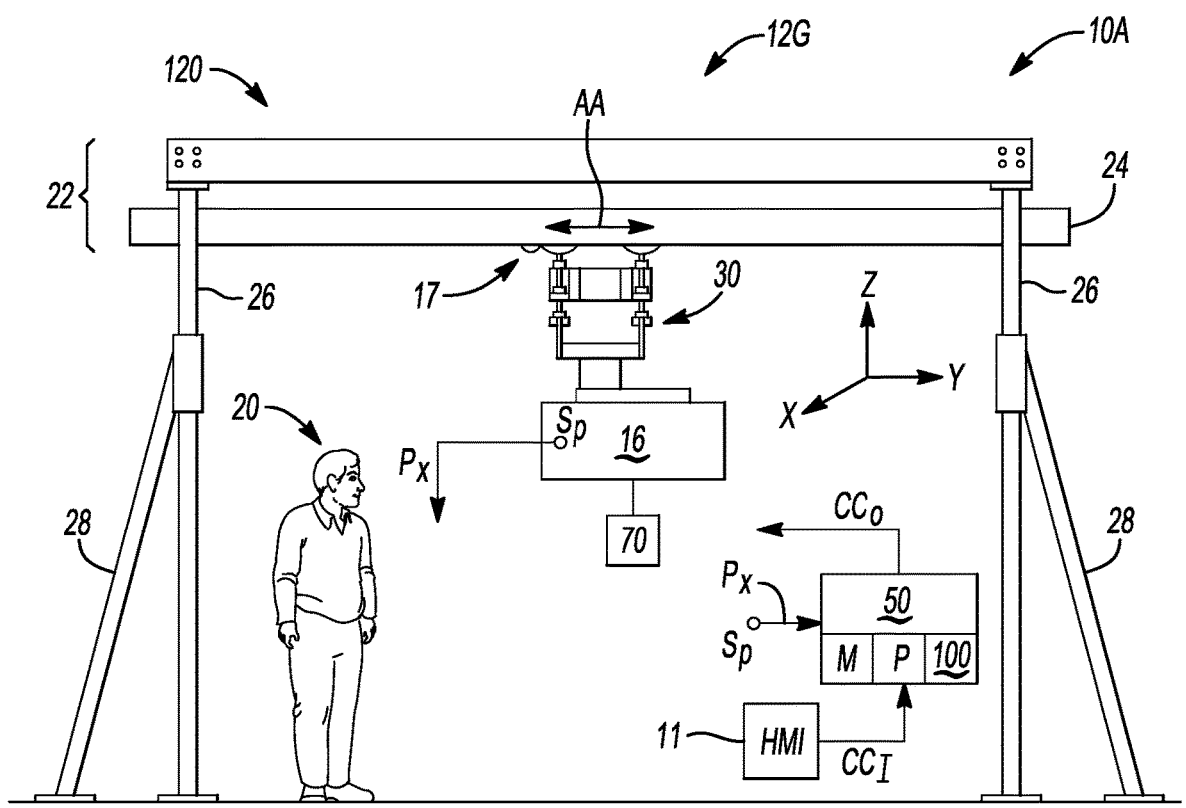

With respect to the controller 50 shown schematically in FIGS. 1 and 2, this device may be embodied as one or more digital computers each having a processor (P) and memory (M). The memory (M) includes sufficient amounts of tangible, non-transitory memory, e.g., read only memory, flash memory, optical and/or magnetic memory, electrically-programmable read only memory, and the like. Memory (M) also includes sufficient transient memory such as random access memory, electronic buffers. Hardware of the controller may include a high-speed clock, analog-to-digital and digital-to-analog circuitry, and input/output circuitry and devices, as well as appropriate signal conditioning and buffer circuitry. The memory (M) may be programmed with computer-readable instructions 100 enabling the controller 50 to control the joint actuators A1-A6, as well as various joints, brakes, and/or locking mechanisms (not shown) as needed, e.g., to arrest motion of the multi-axis robotic system 12 or 120, or to temporarily prevent movement thereof along a given axis of motion.

The controller 50 in some configurations may include an optional human machine interface (HMI) 11, such as a touch screen or a programmable logic control screen, to facilitate selection by the operator 20 of different control modes. The HMI device 11 may be programmed to allow the operator 20 to select a particular task or control mode as input signals (arrow $CC_I$), for instance, or to inform the controller 50 of characteristics of the payload 70 such as size and/or mass.

When using the counterbalance mechanism 16 in conjunction with the multi-axis serial robot 12R of FIG. 1, the counterbalance mechanism 16 may be securely attached to an end-effector 12E of the serial robot 12R. In a representative configuration, the serial robot 12R includes a robot base 14, e.g., a pedestal, column, beam, or other structure. Relative to the operator 20, the robot base 14 may be located on/attached to a floor, ceiling, or another horizontal surface, or on a vertical surface such as a post or beam.

The serial robot 12R may include multiple arm segments 13, 13A, and 13B interconnected to each other and the base 14 via revolute joints J1, J2, J3, J4, J5, and J6 (i.e., revolute joints J1-J6) in a typical 6-axis industrial robot configuration. The revolute joints J1-J6 may be connected to and powered by a respective one of the joint actuators A1, A2, A3, A4, A5, or A6 (i.e., joint actuators A1-A6). Thus, rotational and translational motion of the serial robot 12R may be controlled via the controller 50 via transmission of electronic control signals (arrow $CC_O$) to one or more of the joint actuators A1-A6, as will be appreciated by those skilled in the art.

One or more joint sensors Sp may be positioned on the counterbalance mechanism 16 and the various revolute joints (J1-J6), and configured to measure a corresponding joint position/angle. For simplicity, one such joint sensors Sp is shown connected to the counterbalance mechanism 16, with similar joint sensors Sp possibly being positioned on or along the depicted axes of the revolute joints (J1-J6). Each joint sensor Sp is configured to transmit a measured joint angle signal (arrow Px) to the controller 50, with the joint angle signal (arrow Px) being indicative of the measured joint angle.

Referring briefly to FIG. 2, the overhead rectilinear gantry system 12G may be used as part of an electromechanical system 10A. In such an embodiment, at least some of the above-described revolute joints (J1-J6) of FIG. 1 are part of the rectilinear gantry system 12G. Overhead support beams 22 in the illustrated configuration may have an active/actuated linear positioning mechanism, e.g., a two linear DOF gantry 30 having drive wheels 17 forming a trolley, and possibly providing a rotational DOF. The support beams 22 may include one or more horizontal rails 24, vertical support beams 26, and angled support beams 28. The terms "horizontal" and "vertical" as used herein refer to orientation with respect to a nominal XYZ Cartesian reference frame, with the Z axis being a vertical axis orthogonal to the horizontal X and Y axes, and the X and Y axes being orthogonal with respect to each other.

The support beams 22 together support the weight of the horizontal rails 24 and structure suspended therefrom, including the counterbalance mechanism 16 and the payload 70, with the horizontal rails 24 positioned overhead with respect to the operator 20 while in a standing position as shown. The drive wheels 17 may be actuated via motors, chains, belts, or the like (not shown) so that the counterbalance mechanism 16 and supported payload 70 along the horizontal rails 24 as indicated by double-headed arrow AA, or transverse to the horizontal rails 24 via a transverse beam (not shown). That is, the same drive wheels 17 may, in some embodiments, translate orthogonally with respect to the horizontal rails 24.

Figure 3:
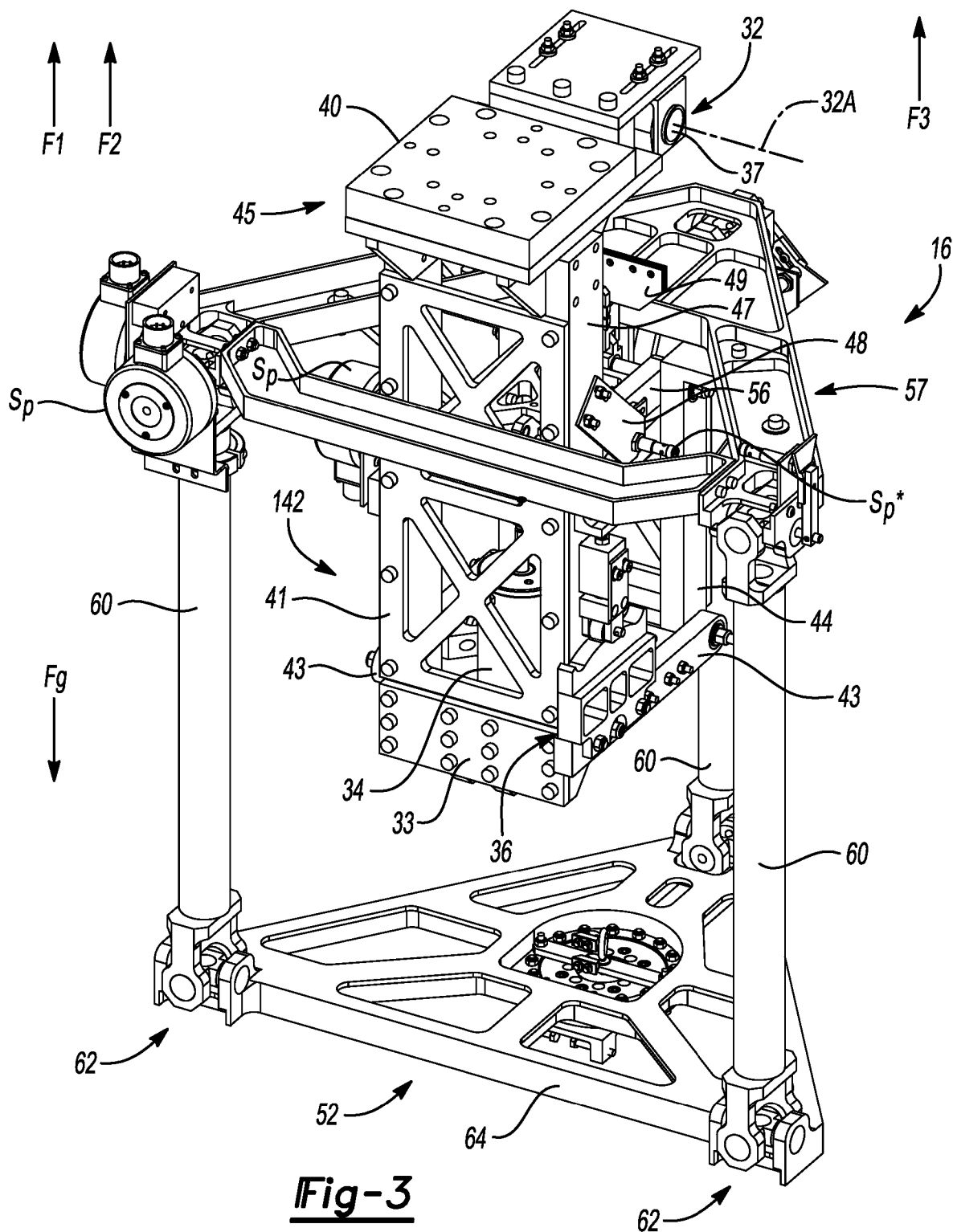
FIG. 3 is a schematic perspective view illustration of an embodiment of the present counterbalance mechanism according to an exemplary embodiment, with the counterbalance mechanism including an optional distal horizontal compliance mechanism.

Referring to FIG. 3, the counterbalance mechanism 16, which moves vertically as indicated by double-headed arrow BB (FIG. 4), incorporates multiple separate vertical force elements to provide both gravity compensation behavior and a self-centering behavior to the suspended payload 70 of FIGS. 1 and 2, including at least a pneumatic cylinder 34 for the former and a spring-loaded cam assembly 36 for the latter. In some optional embodiments, the counterbalance mechanism 16 may also include one or more constant force springs 32, best shown in FIG. 4, to augment the pneumatic cylinder 34. The pneumatic cylinder 34, alone or with the optional constant force springs 32, together perform the above-noted gravity compensation function, i.e., providing respective first and third vertical forces F1 and F3 to the counterbalance mechanism 16 and the connected payload 70 (see FIGS. 1 and 2). The spring-loaded cam assembly 36 separately performs the self-centering function via a second vertical force (arrow F2), with vertical forces F1, F2, and F3 all being directed in a direction opposite the gravitational force (arrow $F_g$) on different but parallel axes.

As will be appreciated by those skilled in the art, a high load, such as the payload 70 of FIGS. 1 and 2, is typically supported using a high spring stiffness. However, by off-loading the self-centering function of the counterbalance mechanism 16 and coupled payload 70 (see FIGS. 1 and 2) to the spring-loaded cam assembly 36 in particular as described herein, the present solution enables the gravity compensation function to be performed by the pneumatic cylinder 34 of FIG. 3, possibly assisted by the constant force springs 32, with relatively low friction and stiffness. While the particular mechanical structure used to support the three force elements may vary from that which is depicted in FIGS. 3-5, those skilled in the art will appreciate that such structure should be constructed of sufficiently rigid and application-appropriate materials, for instance aluminum or another lightweight metal, plastic, composite materials, or the like.

The counterbalance mechanism 16 of FIG. 3 is shown connected to the vertical beams 47 by a corresponding bracket 56, which may be adjusted manually as needed, and which may include an additional joint position sensor $S_p^*$. The counterbalance mechanism 16 also includes a base structure 40 configured to connect to the multi-axis robotic system 12 or 120 of FIGS. 1 and 2, e.g., by clamping or bolting to the end-effector 12E of FIG. 1, and a set of linkages 43, 44, and 48 that are interconnected to form at least one four-bar parallelogram assembly 142 as shown. Linkage 43, forming a horizontal portion of a given four-bar parallelogram assembly 142. A corresponding linkage 48 is parallel to linkage 43 at the top of the four-bar parallelogram assembly 142. Linkage 43 has a rotational degree of freedom about an axis 43A (see FIG. 4) below the spring-loaded cam assembly 36 as indicated by double-headed arrow CC. Each similarly constructed four-bar parallelogram assembly 142 is directly or indirectly supported by the base structure 40 and configured to connect to the payload 70 exemplified in FIGS. 1 and 2.

Optionally, the counterbalance mechanism 16 may be coupled to a distal horizontal compliance mechanism 52 to provide at least one horizontal DOF. For example, the optional horizontal compliance mechanism 52 may be rotatably connected to an upper bracket assembly 57, e.g., the generally triangular arrangement as shown in FIG. 3, which in turn is bolted or fastened to each four-bar parallelogram assembly 142. The distal compliance mechanism 52 may include a plurality of vertical linkages 60 enabling the payload 70 of FIGS. 1 and 2, such as three such vertical linkages 60 as shown, to move with the at least one horizontal DOF as needed. The upper bracket assembly 57 may be connected to the base structure 40 via the vertical beams 47 in a possible embodiment. In such a configuration, the distal compliance mechanism 52 may include a load mounting plate 64, e.g., a triangular plate joined to the vertical linkages 60 by revolute or universal joints 62 as shown. As the horizontal compliance mechanism 52 is optional in the various disclosed embodiments within the scope of the disclosure, the structure thereof is omitted from FIGS. 4 and 5 for illustrative clarity.

Figure 4:
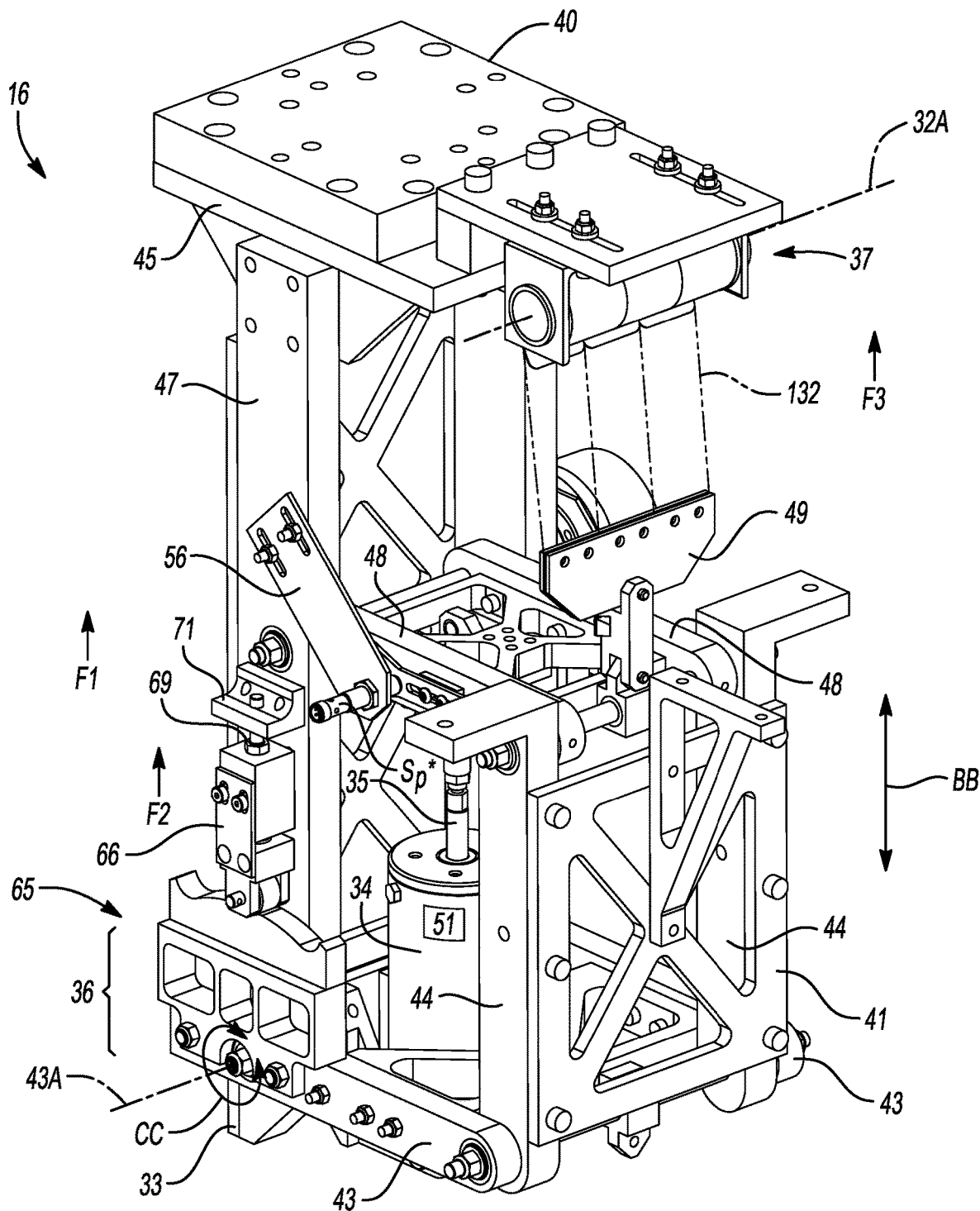
FIG. 4 is another schematic perspective view illustration of the counterbalance mechanism shown in FIG. 3.
Figure 5:
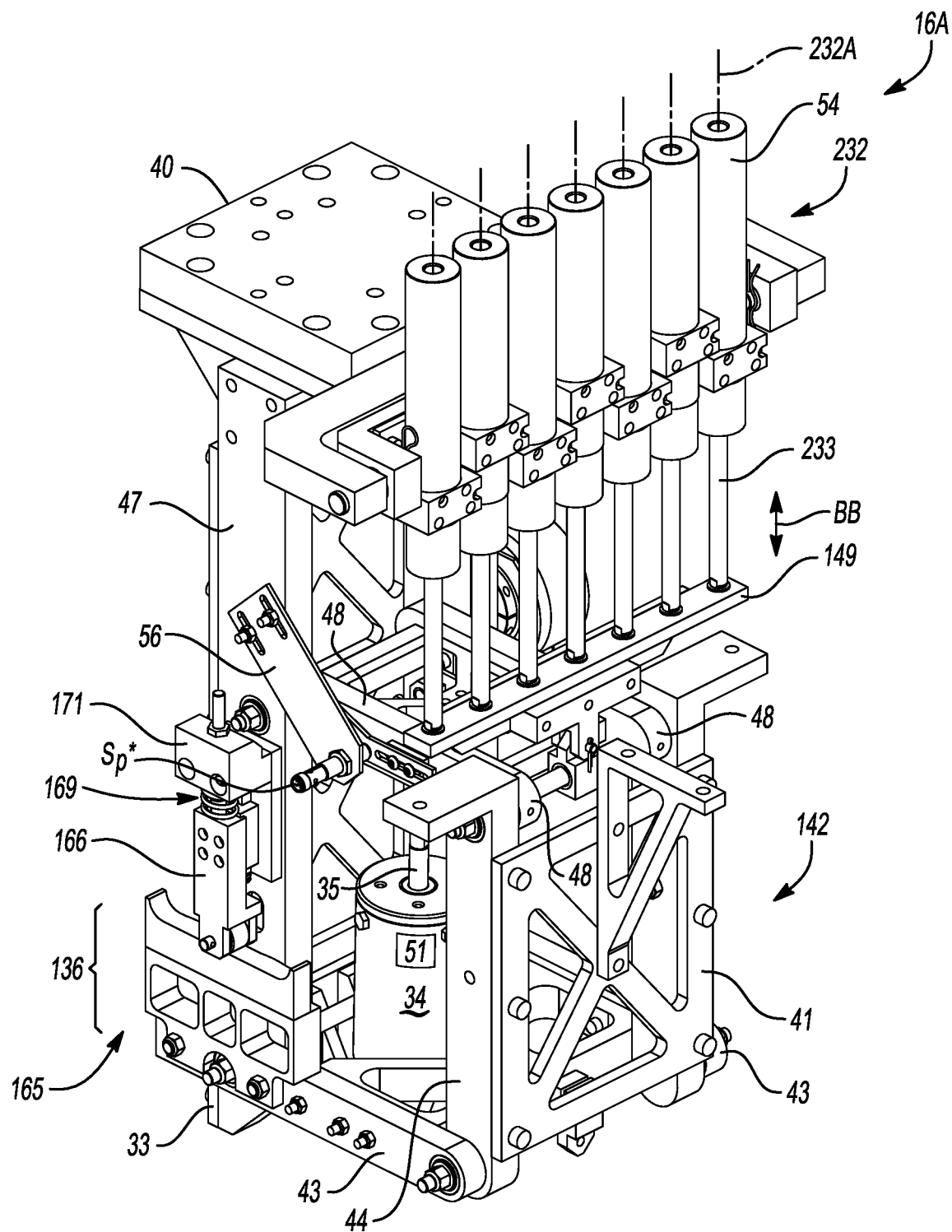
FIG. 5 is a schematic perspective view illustration of an alternative embodiment of the counterbalance mechanism of FIGS. 3 and 4 in which the counterbalance mechanism includes an optional set of magnetic springs.

As part of the disclosed construction, each optional constant force spring 32 is connected to the base structure 40, e.g., about a cylindrical core 37 having a spring axis 32A in the non-limiting embodiment of FIG. 3 corresponding to FIG. 4, and configured to impart the third vertical force (arrow F3) to the four-bar parallelogram assembly 142. In a similar manner, the pneumatic cylinder 34 is connected to the four-bar parallelogram assembly 142 and configured to impart the first vertical force (arrow F1) to the four-bar parallelogram assembly 142, again for providing the above-noted gravity compensation function or behavior.

Likewise, the spring-loaded cam assembly 36 connected to the four-bar parallelogram assembly 142 is configured to impart the second vertical force (arrow F2) to the four-bar parallelogram assembly 142. The respective first, second, and optional third vertical forces F1, F2, and F3 therefore combine to provide the above-noted gravity compensation function/behavior and the self-centering function/behavior for the payload 70 of FIGS. 1 and 2 when the payload 70 is coupled to the four-bar parallelogram assembly 142, either directly or via an intervening horizontal compliance mechanism 52. Doing this enables the payload 70 to be moved with a vertical DOF when the payload 70 is manually acted upon by the operator 20 of FIGS. 1 and 2, and to return the payload 70 to a nominal center equilibrium position as shown in FIG. 3 when the payload 70 and/or the counterbalance mechanism 16 is no longer manually acted upon by the operator 20.

The base structure 40 may include a distal face plate 45 coupled to the optional constant force spring 32, and a parallel pair of the vertical support beams 47 fixedly connected thereto. For added rigidity, the four-bar parallelogram assembly 142 may include a pair of four-bar parallelogram assemblies 142 arranged in parallel planes, with the pair of four-bar parallelogram assemblies 142 joined on either end by supporting face plates 41, e.g., X-shaped or latticed structure providing additional structural rigidity when two of the four-bar parallelogram assemblies 142 are used. A mounting extension 33 may likewise provide additional structural integrity and available surface area for connecting the payload 70 of FIGS. 1 and 2. The joint sensors Sp of FIGS. 1 and 2 may be configured to measure a joint angle of the four-bar parallelogram assembly 142, and to transmit the measured joint angle signal (arrow Px) shown in FIGS. 1 and 2 to the controller 50.

Gravity Compensation Via First Vertical Force F1:

further with respect to the pneumatic cylinder 34, best shown in FIGS. 4 and 5, this device may be embodied as a fixed canister of pressurized air or an inert gas in which a piston 35 imparts the first vertical force (arrow F1) to each four-bar parallelogram assembly 142, e.g., to the linkage 48 in contact with the piston 35 directly or via an intervening member (not shown). In this manner, translation of the piston 35 within the pneumatic cylinder 34 urges the four-bar parallelogram assembly 142 in a direction opposite the gravitational force (arrow $F_g$ of FIG. 3). The pneumatic cylinder 34 and the above-described optional constant force spring 32 thus work together to provide the gravity compensation function noted above, with the load on the pneumatic cylinder 34 reduced by operation of the optional constant force spring 32, which in turn reduces friction.

A degree of automatic control may be provided over the first vertical force F1 using an electronically-variable regulator 51. Although shown schematically in FIGS. 4 and 5, such an electronically-variable regulator 51 may be positioned anywhere on the counterbalance mechanisms 16 or 16A in communication with the controller 50 of FIGS. 1 and 2. As appreciated in the art, the electronically-variable regulator 51 may be used to automatically adjust the first vertical force F1.

That is, the electronically-variable regulator 51 is configured to adjust the first vertical force (arrow F1 of FIG. 3) in response to the pressure control signal from the processor (P), with the pressure control signal being indicative of a change in the payload 70, e.g., a new payload 70 or a release thereof, as part of the control signals (arrow $CC_J$) of FIGS. 1 and 2. Such adjustment is in contrast to the third vertical force (arrow F3) of the optional constant force spring 32, which in the illustrated embodiments of FIGS. 3-5 is constant, i.e., not variable. Using feedback from the various joint sensors Sp of FIGS. 1 and 2, for example, the controller 50 could adjust the first vertical force (arrow F1) to better compensate for the gravitational force (arrow Fg) acting on the suspended payload 70.

Self-Centering Via Second Vertical Force F2:

as noted above, the gravity compensation function served by the pneumatic cylinder 34, possibly the constant force spring 32, and their respective first and third vertical forces F1 and F3, is separate from the self-centering function provided by the spring-loaded cam assembly 36 of FIG. 4. In a possible embodiment, a cam follower piece 65 and connected cam body 66 are biased by a spring 69 and translate with respect to the vertical beam 47. A stop piece 71 mounted to the vertical beam 47 defines a limit of a range of motion of the spring-loaded cam assembly 36. The spring 69 thus urges the spring-loaded cam assembly 36 in an upward direction via the second vertical force F2 to enable the counterbalance mechanism 16 to remain centered relative to the vertical beam 47.

A similar construction is shown in FIG. 5 with an alternative spring-loaded cam assembly 136 of FIG. 5, with alternatively shaped cam follower piece 165 and connected cam body 166 biased by a spring 169. An alternatively shaped stop piece 171 mounted to the vertical beam 47 defines a limit of a range of motion of the spring-loaded cam assembly 36. Thus, the particular size and shape of the spring-loaded cam assembly 36 may vary with the application within the scope of the disclosure, with two different examples shown in FIGS. 4 and 5. Workable embodiments, however, will impart the second vertical force (arrow F2) to self-center the connected counterbalance mechanism 16 or 16A and its connected payload 70.

Gravity Compensation Via Optional Third Vertical Force F3:

with respect to the constant force spring 32 of FIG. 3, in order to provide the third vertical force (arrow F3) as a constant, non-variable upward-direction force diametrically opposing the gravitational force (arrow $F_g$), the constant force spring(s) 32 may be embodied as a mechanical spring as shown in FIGS. 3 and 4. For instance, the constant force spring 32 may include a rolled sheet metal spring 132 as shown in phantom line format in FIG. 4. The rolled sheet metal spring 132 may be held under tension on a spring-loaded cylinder 37 and securely fastened to a mounting plate 49, e.g., via rivets or other suitable fasteners, welding, etc., in a manner analogous to a wound clock spring. When the constant force spring 32 is omitted, so too may be the mounting plate 49 and associated mounting hardware. Load balancers, pulleys, or other suitable mechanisms may be used to implement the mechanical spring in other embodiments. Such a constant force spring 32 could be used in some embodiments to provide the third vertical force (arrow F3 of FIG. 2), thus augmenting the first vertical force (arrow F1) of the pneumatic cylinder 34.

Referring briefly to FIG. 5, in lieu of mechanical springs, such as the exemplary rolled sheet metal spring(s) 132 of FIGS. 3 and 4, an alternative counterbalance mechanism 16A may include a set of magnetic springs 232. As understood in the art, magnetic springs 232 may include multiple discrete magnetic spring elements 54 each applying the third force (arrow F3 of FIG. 3), collectively, via spring extensions 233 arranged along multiple parallel spring axes 232A. The spring extensions 233 terminate in an end plate 149 as shown, which in turn is connected to the parallelogram assembly 142. Thus, a magnetic force may be used to repel or attract in the direction of the third vertical force (arrow F3) so as to compensate for the gravitational force (arrow $F_g$ of FIG. 3) acting on the four-bar parallelogram assembly 142 and its connected payload 70 of FIGS. 1 and 2. Although the embodiment of FIG. 5 may be relatively expensive to implement in relation to the embodiment of FIGS. 3 and 4, due primarily to the cost and mass of the magnetic springs 232, the extended life of the magnetic springs 232 may be expected to provide offsetting benefits, possibly including a downsized pneumatic cylinder 34.

As appreciated by those skilled in the art, use of the counterbalance mechanism 16 and 16A as described above with reference to FIGS. 1-5 provides a myriad of benefits when employed in a manufacturing or assembly workload, particularly one in which collaborative robotics are required with desirable task loading and ergonomic qualities. Such benefits are enabled with a vertical DOF, and possible one or more horizontal DOF in different embodiments, with resulting low-impedance gravity compensation and low-stiffness self-centering behavior. The present teachings are likewise adapted to variable payloads, with control over the motions of the robotic systems 10 and 10A of FIGS. 1 and 2 in conjunction with possible adjustments of the pneumatic cylinder 34. These benefits and other possible benefits will be readily appreciated by one skilled in the art in view of the foregoing disclosure.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

What is claimed is:

1. An electromechanical system operable through physical interaction with an operator, the electromechanical system comprising:
   a multi-axis robotic;
   a controller in communication with the multi-axis robotic; and
   a counterbalance mechanism connected to the multi-axis robot, including:
      a base structure configured to connect to the multi-axis robot;
      a set of linkages that are rotatably interconnected to form a four-bar parallelogram assembly, wherein the four-bar parallelogram assembly is connected to the base structure and configured to connect to a load;
      a pneumatic cylinder connected to the four-bar parallelogram assembly and having an electronically-variable regulator, wherein the pneumatic cylinder is configured to impart a first vertical force to the four-bar parallelogram assembly; and
      a spring-loaded cam assembly connected to the four-bar parallelogram assembly, and configured to impart a second vertical force to the four-bar parallelogram assembly;
   wherein the first vertical force and the second vertical force respectively provide a gravity compensation function and a self-centering function for the load when the load is connected to the four-bar parallelogram assembly, thereby enabling the load to move with a vertical degree of freedom when the load is manually acted upon by the operator, and to return to a nominal center position when the load is released or no longer manually acted upon by the operator.

2. The electromechanical system of claim 1, wherein the multi-axis robot includes an articulated serial robot having an end-effector, and wherein the base structure is configured to connect to the multi-axis robot via the end-effector.

3. The electromechanical system of claim 1, wherein the multi-axis robot includes an overhead rectilinear system having a translatable linkage, and wherein the base structure is configured to connect to the multi-axis robot via the translatable linkage.

4. The electromechanical system of claim 1, wherein the base structure includes a distal face plate and a parallel pair of vertical support beams fixedly connected thereto.

5. The electromechanical system of claim 1, wherein the counterbalance mechanism includes a constant force spring connected to the base structure and the four-bar parallelogram assembly, wherein the counterbalance mechanism is configured to impart a third vertical force to the four-bar parallelogram assembly to augment the first vertical force.

6. The electromechanical system of claim 5, wherein the constant force spring includes a mechanical spring.

7. The electromechanical system of claim 5, wherein the constant force spring includes a set of magnetic springs.

8. The electromechanical system of claim 1, further comprising:
   at least one joint sensor in communication with the controller, wherein the at least one joint sensor is configured to measure a respective joint angle of the four-bar parallelogram assembly, and to transmit a measured joint angle signal to the controller that is indicative of the respective joint angle, and wherein the controller is configured to adjust or maintain a position of the multi-axis robot in response to the measured joint angle signal.

9. The electromechanical system of claim 1, wherein the controller is in communication with the electronically-variable regulator, and the electronically-variable regulator is configured to adjust the first vertical force in response to a pressure control signal from the controller indicative of a change in the load.

10. The electromechanical system of claim 1, wherein the set of linkages includes a first set of linkages and a second set of linkages, and wherein the four-bar parallelogram assembly includes a pair of four-bar parallelogram assemblies respectively constructed from the first set of linkages and the second set of linkages.

11. The electromechanical system of claim 1, further comprising: an upper bracket assembly and a distal compliance mechanism rotatably connected thereto, wherein the counterbalance mechanism is connected to the upper bracket assembly, and wherein the distal compliance mechanism includes a plurality of vertical linkages enabling the load to move with a horizontal degree of freedom.

12. A counterbalance mechanism for use with a multi-axis robot and for physical interaction of the counterbalance mechanism with an operator, the counterbalance mechanism comprising:
   a base structure configured to connect to the multi-axis robot;
   a set of linkages that are rotatably interconnected to form a four-bar parallelogram assembly, wherein the four-bar parallelogram assembly is connected to the base structure and configured to connect to a load;
   a pneumatic cylinder connected to the four-bar parallelogram and configured to impart a first vertical force to the four-bar parallelogram assembly, the pneumatic cylinder having an electronically-variable regulator configured to adjust the first vertical force in response to a pressure control signal from an external processor indicative of a change in the load; and
   a spring-loaded cam assembly connected to the four-bar parallelogram assembly and configured to impart a second vertical force to the four-bar parallelogram assembly;
   wherein the first vertical force and the second vertical force respectively provide a gravity compensation function and a self-centering behavior for the load when coupled to the four-bar parallelogram assembly, thereby enabling the load to move with a vertical degree of freedom when the load is manually acted upon by the operator, and to return the load to a nominal center position when the load is no longer manually acted upon by the operator.

13. The counterbalance mechanism of claim 12, wherein the counterbalance mechanism includes a constant force spring connected to the base structure and the four-bar parallelogram assembly, wherein the constant force spring is configured to impart a third vertical force to the four-bar parallelogram assembly that augments the first vertical force.

14. The counterbalance mechanism of claim 13, wherein the constant force spring includes a mechanical spring.

15. The counterbalance mechanism of claim 14, wherein the mechanical spring includes a rolled sheet metal spring.

16. The counterbalance mechanism of claim 13, wherein the constant force spring includes a set of magnetic springs.

17. The counterbalance mechanism of claim 12, wherein the base structure includes a distal face plate and a parallel pair of vertical support beams fixedly connected thereto, and wherein the spring-loaded cam assembly is connected to one of the vertical support beams.

18. The counterbalance mechanism of claim 12, further comprising:
   at least one joint sensor configured to measure a joint angle of the four-bar parallelogram assembly, and to transmit a measured joint angle signal indicative of the joint angle to an external controller.

19. The counterbalance mechanism of claim 12, wherein the set of linkages includes a first set of linkages and a second set of linkages, and wherein the four-bar parallelogram assembly includes a pair of four-bar parallelogram assemblies arranged in parallel planes.

20. The counterbalance mechanism of claim 12, further comprising:
   an upper bracket assembly and a distal compliance mechanism rotatably connected thereto, wherein the counterbalance mechanism is connected to the upper bracket assembly, and wherein the distal compliance mechanism includes a plurality of vertical linkages enabling the load to move with a horizontal degree of freedom.

* * * * *